US007298479B2

(12) United States Patent
Politze et al.

(10) Patent No.: US 7,298,479 B2
(45) Date of Patent: Nov. 20, 2007

(54) FIRE DETECTOR DEVICE

(75) Inventors: Heiner Politze, Neuss (DE); Ralf Sprenger, Duisburg (DE); Tido Krippendorf, Erkelenz (DE); Waldemar Ollik, Rheinsserg (DE)

(73) Assignee: Novar GmbH, Neuss (DE)

( * ) Notice: Subject to any disclaimer, the term of this patent is extended or adjusted under 35 U.S.C. 154(b) by 0 days.

(21) Appl. No.: 11/759,264

(22) Filed: Jun. 7, 2007

(65) Prior Publication Data

US 2007/0229824 A1 Oct. 4, 2007

Related U.S. Application Data

(62) Division of application No. 10/647,318, filed on Aug. 26, 2003, now Pat. No. 7,239,387.

(30) Foreign Application Priority Data

Oct. 7, 2002 (DE) ............................... 102 46 756

(51) Int. Cl.
*G01N 15/02* (2006.01)

(52) U.S. Cl. ...................................................... 356/338

(58) Field of Classification Search ..................... None
See application file for complete search history.

(56) References Cited

U.S. PATENT DOCUMENTS

| | | | | |
|---|---|---|---|---|
| 3,982,130 | A | 9/1976 | Trumble | |
| 4,420,256 | A * | 12/1983 | Fladda et al. | 356/336 |
| 5,051,595 | A | 9/1991 | Kern et al. | |
| 5,280,272 | A | 1/1994 | Nagashima et al. | |
| 5,352,901 | A | 10/1994 | Poorman | |
| 6,011,478 | A | 1/2000 | Suzuki et al. | |
| 6,218,950 | B1 | 4/2001 | Politze et al. | |
| 7,075,646 | B2 * | 7/2006 | Cole | 356/338 |
| 2003/0223063 | A1 | 12/2003 | Hill et al. | |
| 2006/0114112 | A1 | 6/2006 | Cole | |

FOREIGN PATENT DOCUMENTS

| | | |
|---|---|---|
| GB | 2397122 A | 7/2004 |
| WO | WO 0007161 | 2/2000 |

OTHER PUBLICATIONS

Goodman, D.S., "Method for Localizing Light-Scattered Particles," IBM Technical Disclosure Bulletin, IBM Corp., New York, US vol. 27, No. 5 (Oct. 1, 1984), p. 3164, XP002066860 ISSN: 0018-8689.

* cited by examiner

*Primary Examiner*—Tu T Nguyen
(74) *Attorney, Agent, or Firm*—Edell, Shapiro & Finnan, LLC

(57) ABSTRACT

The sensitivity of scattered-light fire detectors for small particles can be increased substantially when blue light is introduced into the measuring volume in addition to an infrared radiation and the scattered radiation produced by the particles is measured and evaluated separately from each other in the infrared and blue region both in the forward scattering region as well as in the backward scattering region. This can be realized by a fire detector that includes two transmitter LEDs (2.1*a*, 2.1*b*) and two photodetectors (2.2*a*, 2.2*b*), with these components being arranged such that the photodetectors receive both the forward scattered radiations as well as the backward scattered radiations of the longer and shorter wavelengths separately from each other. A multi-channel evaluation circuit is provided downstream of the photodetectors.

7 Claims, 3 Drawing Sheets

FIRE DETECTOR DEVICE

CROSS REFERENCE TO RELATED APPLICATIONS

This application is a divisional of U.S. patent application Ser. No. 10/647,318, entitled “Fire Detection Method and Fire Detector Therefor” and filed 26 Aug. 2003 now U.S. Pat. No. 7,239,387, the entire disclosure of which is hereby incorporated by reference in its entirety.

BACKGROUND OF THE INVENTION

1. Field of the Invention

The invention relates to a method for recognizing fires according to the scattered light principle by pulsed emission of a radiation of a first wavelength along a first radiation axis as well as a radiation of a second wavelength which is shorter than the first wavelength along a second radiation axis into a measuring volume and by measuring the radiation scattered on the particles located in the measuring volume under a forward scattering angle of more than 90° and under a backward scattering angle of less than 90°. The invention further relates to a scattered-light fire detector for performing this method.

2. Description of the Related Art

A scattered-light detector is known from WO 01/59 737 which is provided especially for installation in ventilation and air-conditioning conduits, which operates according to the aforementioned method and where a first light-emitting diode (LED) emits infrared light and a second LED emits blue light into its measuring chamber. The LEDs are pulsed in an alternating fashion. The radiation produced by the “infrared” LED allows recognizing large particles which are typical for a smouldering fire. The scattered radiation produced by the “blue” LED allows recognizing small particles which are typical for fires with open flames. This is explained by Rayleigh’s law, according to which the intensity of the scattered light decreases with the fourth power of the wavelength for particles which are smaller than the wavelength. Although the latter is correct, it does not fulfill the actual conditions in recognizing fires according to the scattered light principle. The known fire detector comprises only a single photodetector which supplies only two pieces of information on the scattered light intensities, namely, depending on the embodiment, either the intensity of the forward scattered radiation in the infrared and in the blue wavelength region or the respective intensities of the backward scattered radiations or also the intensity of the forward scattered radiation in the infrared wavelength region and the backward scattered radiation in the blue wavelength region. The respective arrangement criteria lead to the consequence, however, that the measuring volumes from which the respective scattered radiation is obtained are not identical.

From DE 199 02 319, a fire detection method is known in which the alarm decision is made depending on the ratio of the intensity of the IR forward scattered radiation to the intensity of the IR backward scattered radiation. The respective fire detector works optionally with two infrared LEDs and a photodetector or vice-versa with one infrared LED and two photodetectors. The angle under which the forward scattered radiation is measured is preferably 140°, and the angle under which the backward scattered radiation is measured is preferably 70°. The formation of the ratio of the intensities of the forward and backward scattered radiation allows distinguishing bright from dark types of smoke, because bright smoke supplies a high forward scattered signal and a comparatively small backward scattered signal, whereas, conversely, dark smoke supplies a lower forward scattered signal and a comparatively high backward scattered signal. The processing of the absolute intensities or signal level by taking into account the principally lower intensities in the backward scattering region in relationship to the intensities produced in the forward scattering region by the same particles with the same intensity and the simultaneous processing of the ratios or quotients of these signals also allow distinguishing certain deceptive values of smoke. For example, water vapor in high concentration produces a high forward scattered signal which according to the older state of the art leads to the initiation of an alarm, in this case, to a false alarm. The formation of the quotient from the forward scattered intensity and the backward scattered intensity leads to a value which is characteristic for water vapor, which value is substantially independent of the concentration. By determining this quotient and considering it in the further signal processing it is thus possible to suppress any false alarms that would occur otherwise. The known method and the detector which operates according to this method have a common feature with all other known constructions of scattered-light fire detectors which operate on the basis of infrared light, which feature is the disadvantage of an inadequate sensitivity for small and very small particles. This makes it more difficult to recognize open fires in due time, and especially wood fires whose smoke is characterized by a very small particle size. In the case of a respective hazardous situation it is therefore still necessary to use ionization fire detectors which respond very well to small particles and which work with a preparation of low radioactivity. Due to this radioactive preparation, the production of ionization fire detectors is complex and their use is unpopular and even generally prohibited in a number of countries.

SUMMARY OF THE INVENTION

The invention is based on the object of providing a method which, with little additional effort, considerably improves the sensitivity of scattered-light fire detectors for small particles and thus the usability of such detectors for recognizing hot and very hot fires, this not being at the expense of an increase in the frequency of false alarms. With respect to the method of the kind mentioned above, this object is achieved in such a way that the forward scattered radiation and the backward scattered radiation of the first and the second wavelength are measured and evaluated separately from each other.

Four measured values can be obtained in this manner in each measuring cycle, which measured values can be processed both individually as well as in combination with each other in order to allow making a secure alarm decision after the comparison with the assigned reference values. The corresponding quiescent value levels which are multiplied with a factor $\leqq 1$ are preferably subtracted from the signal levels which correspond to the four measured intensities of the scattered radiations. The resulting values are weighted, and the weighted values are processed in an evaluation logic circuit, compared with stored values, and the comparison values are combined and evaluated. Depending on the result, at least one alarm signal is produced. Depending on the intelligence implemented in the detector, it is possible to produce a pre-alarm signal for example, a smoke identification signal, a master alarm signal, etc., depending on the result.

In particular, the ratio between the weighted values of the forward scattered radiation intensity and the backward scattered radiation intensity of the first wavelength and the ratio between the weighted values of the forward scattered radiation intensity and the backward scattered radiation intensity of the second wavelength can be formed and are processed in an evaluation logic circuit, compared with stored values, and the comparison values are combined and evaluated. Depending on the result, at least one alarm signal can be produced.

Furthermore, the ratio of the weighted values of the forward scattered radiation intensity of the first and the second wavelength and the ratio of the weighted values of the backward radiation intensity of the first and second wavelength are formed and the determined comparison values are processed in an evaluation logic circuit, compared with stored values, and the comparison values are combined and evaluated. Depending on the result, at least one alarm signal can be produced. In addition, the determined comparison values can be placed in a ratio on their part and the result can be compared with stored values and the result of the comparison can be considered in the further processing.

Favorable geometrical conditions are obtained when the forward scattered radiations of the first and the second wavelength are measured under the same forward scattering angle, and the backward scattered radiations of the first and second wavelength are measured under the same backward scattering angle, which on the one hand limits the need for optoelectric components to two LEDs and two photodetectors (e.g., photodiode sensors), and on the other hand allows a principally similar electric processing of all four measured values. The scattered radiations of the first and second wavelength can be measured on opposite sides of the measuring chamber on the same main axis. Preferably, the radiations of the first and second wavelength are emitted from opposite sides along coinciding radiation axes into the measuring volume. The thus obtained point symmetry to the center of the measuring volume ensures that the measured scattered radiation intensities originate from identical measuring volumes, which facilitates their comparability.

The first wavelength and the second wavelength are appropriately chosen in such a way that they do not stand in an integral ratio with respect to each other. When the first wavelength and the second wavelength stand at a ratio of 1:2, for example, particles which would produce an especially high forward scattered signal at a first wavelength also produce a signal increased in the manner of a secondary maximum when illuminated with the second wavelength. On the other hand, particles with a circumference equal to the longer wavelength which would then reflect especially well would strongly absorb at half the wavelength, i.e., they would produce virtually no scattered light.

In the current state of the art concerning the technology of producing LEDs, it is preferable to choose the first wavelength in the region of the infrared radiation and the second wavelength in the region of the blue light or the ultraviolet radiation. More preferably, the first wavelength is in the region of 880 nm and the second wavelength is in the region of 475 nm or 370 nm.

The pulse/pause ratio of the radiation of the first and the second wavelength is appropriately higher than 1:10,000 and preferably in the region of 1:20,000, because high radiation intensities are necessary for achieving a sufficiently high sensitivity. The electric power required for this purpose not only burdens the power supply of the detector but also leads to a considerable heating of the radiation-producing chips of the LEDs, so that after each pulse a sufficiently long cooling period is necessary in order to avoid overheating.

In order to perform the method in accordance with the invention and thus to achieve the object in accordance with the invention, a scattered-light fire detector comprises a measuring chamber which communicates with the ambient air and which delimits a measuring volume into which infrared-radiating and blue-radiating LED emit from different directions and in which the radiation scattered by the particles situated in the measuring volume is measured in a photoelectric manner and is evaluated, with the detector comprising two photodetectors in accordance with the invention, which photodetectors are situated opposite of each other with respect to the measuring volume and have a common main axis with which the radiation axes of the two LEDs enclose an acute angle of less than 90° and intersect in a point which is situated on the main axis and is situated in the center of the measuring volume.

The LEDs can be arranged on the same side of the main axis. The one photodetector measures the forward scattered radiation of the infrared-radiating LED and the backward scattered radiation of the blue-radiating LED, whereas the other photodetector conversely measures the forward scattered radiation of the blue-radiating LED and the backward scattered radiation of the infrared-radiating LED. The LEDs can be arranged alternatively in a symmetrical manner to the main axis, so that the one photodetector measures both forward scattered radiations and the other photodetector measures both backward scattered radiations. Preferably, however, the LEDs are arranged in a point-symmetrical fashion to the center of the measuring volume, so that their radiation axes coincide. As a result, both the LEDs as well as the photodetectors are precisely opposite in pairs. This leads to the advantage that the measured four scattered radiation intensities each start out from an identical measuring volume. Moreover, this symmetrical arrangement also facilitates the substantially reflection-free configuration of the measuring chamber, allows a symmetrical arrangement of the circuit board on which the LEDs and the photodetectors are situated and leads to a sensitivity of the detector which is rotation-symmetrical and thus at least substantially independent of the direction of the air entrance.

Preferably, the radiation axes of the LEDs each enclose with the main axis an acute angle of approximately 60°. The respective backward scattered radiation is measured under this angle. The corresponding forward scattered radiation on the other hand is measured under the complementary angle of 120°. It has been observed that this is a favorable compromise between the value of 70°, which is more favorable for the measurement of the backward scattered radiation, and the diameter of the measuring chamber, which relevantly influences the outside diameter of the detector.

To protect the photodetectors from direct illumination by the LEDs and from illumination by radiation reflected on the walls of the measuring chamber and to keep the illumination of the measuring volume by reflected radiation as low as possible, every LED and every photodetector is appropriately located in its own, individual tube body. Moreover, diaphragms and radiation traps are arranged outside of the measuring volume between the LEDs and the photodetectors.

BRIEF DESCRIPTION OF THE DRAWINGS

The method in accordance with the invention is explained below by reference to the drawings which show three embodiments of a respective scattered-light fire detector, wherein.

DESCRIPTION OF THE PREFERRED EMBODIMENTS

Figure 1:
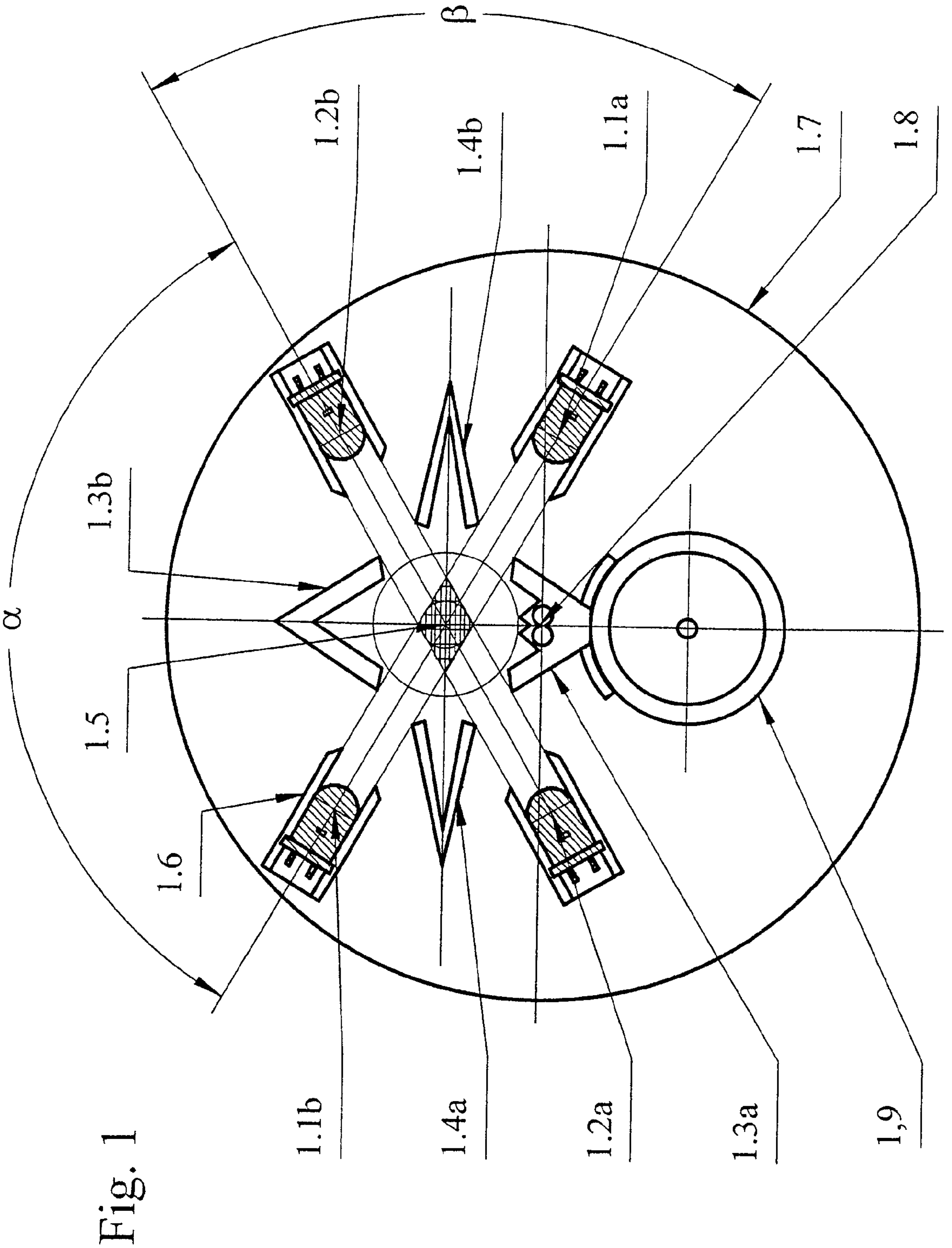
FIG. 1 shows a top view intersected at the height of the optical axes of the base plate of the fire detector in a first embodiment, which base plate carries the measuring chamber.

The method in accordance with the invention assumes the following: depending on the type of the burning material, a wide range of incineration products are obtained which are designed below as aerosols or also as particles for the sake of simplicity. Hot fires produce large quantities of aerosols of small diameter. For example, an aerosol structure or cluster comprising 100 molecules of $CO_2$ has a diameter of approximately 2.5 nm. Fires with a so-called low energy conversion per unit of time, i.e., so-called smoldering fires, produce aerosols with a diameter of up to 100 μm and partly also macroscopic suspended matter, e.g., ash particles. A scattered-light fire detector which is suitable for recognizing all kinds of fires would therefore have to recognize aerosols with a diameter of 2.5 nm to 100 μm, i.e., it would have to cover a range of five powers of ten.

As a result of their high efficiency, infrared-radiating GaAs LEDs have been used exclusively in practice as radiation sources in scattered-light fire detectors, which LEDs radiate at a wavelength λ of 880 nm. The intensity of the scattered radiation caused by a particle primarily depends on the ratio of the diameter of the particle (which is assumed to be a sphere for the sake of simplicity) to the wavelength of the incident radiation. Although the shape and the absorption coefficient of the particle play an additional role, these parameters can obviously not be influenced in the present context. The so-called Rayleigh scattering decreases proportionally to $\lambda^4$ for a particle diameter below 0.1λ. It follows from this that fire detectors working with infrared-radiating LEDs have a steeply dropping sensitivity for particle diameters of less than approximately 90 nm. An additional factor is that the Rayleigh scattering is not Omnidirectional but has characteristic maximums at 0° and 180° and characteristic minimums at 90° and 270°. For particles with diameters of 0.1λ to 3λ, which in the case of an infrared-radiating LED is from approximately 90 nm to approximately 2.5 μm, the Mie effect is relevant, which is even stronger directionally dependent than the Rayleigh scattering and moreover shows destructive and constructive interference effects by interaction of the introduced radiation with the radiation reflected on the particle. Above 3λ the scattering intensity is substantially independent of the wavelength and depends primarily on the type and the shape of the particle.

It follows from this that the low sensitivity of scattered-light fire detectors for hot fires, e.g., open wood fires, is caused by the high wavelength of the infrared radiation in relationship to the diameter of the particles to be detected. This can be counteracted neither by increasing the amplification of the signal supplied by the photodetectors, nor by increasing the intensity of the introduced radiation, because in both cases the sensitivity of the detector for large and macroscopic particles (e.g., dust, vapors from industrial processes and cigarette smoke) will become too high.

By alternately irradiating the measuring volume with infrared radiation and blue light and by separately processing the signals proportional to the received scattered radiation, it is possible, as is principally known from the aforementioned WO 01/59 737, to considerably increase the sensitivity of the detector for particles of small diameter, especially such for which the Rayleigh radiation is relevant. It can be easily shown mathematically that the sensitivity increases by a factor of 10 or more. The increase in the sensitivity of the detector for particles of a small diameter is alone not sufficient for obtaining a secure alarm decision, i.e., for avoiding false or deceptive alarms. It is not the case, contrary to the assumption made in WO 01/59 737, that the irradiation of the measuring volume with blue light for large and small particles supplies scattered radiation of approximately the same intensity. Examinations on this part have shown to the contrary that especially small particles supply scattered radiation of very similar intensity in the infrared region and under blue light, both in the forward and, at a lower level, the backward radiation region. As was further observed, it is only the addition of the angular dependence of the intensity of the scattered radiation which allows obtaining secure criteria which allow differentiating between deceptive values and consequential products of fires in a manner substantially independent of the kind of the material that is burned.

In accordance with the invention, four scattered radiation intensities are therefore measured in each measuring cycle, namely the forward scattered radiation and the backward scattered radiation in the infrared region and the same values in the blue light region. The corresponding quiescent value level, preferably with a reduction for security purposes (according to a multiplication of the quiescent value levels with a factor <1, i.e., a scaled quiescent value level), is subtracted from the signal levels which are proportional to the measured intensities, which subtraction is made for increasing the measuring dynamics and in order to simplify the further processing. The thus obtained resulting values are then compared in an evaluation logic circuit with stored values, especially threshold values. Additional information is obtained by the formation of the quotients of the resulting values and renewed comparison with the stored reference values. The results of these operations can be combined and evaluated on their part, e.g., adjusted to the respective environment in which the detector is used. In this way a number of meaningful intermediate results can be obtained, e.g., for different preliminary alarms and finally also alarm signals.

FIG. 1 shows a first preferred embodiment of a detector suitable for performing this method. A spherical measuring volume with a center 1.5 is defined on a base plate 1.7, which measuring volume is schematically indicated with a thin circle. An infrared-radiating LED 1.1*a* emits radiation along a first radiation axis into said measuring volume. Precisely opposite of the same, there is a blue-radiating LED 1.1*b* which emits radiation into the measuring volume along a second radiation axis. The first and the second radiation axis coincide. A main axis under an angle of α=120° to this common radiation axis also extends through the center 1.5 of the measuring volume. A first photodiode 1.2*a* and 1.2*b* are arranged opposite of one another on said main axis. As a result, the main axis on which the respective receiving axes of the two photodiodes are situated encloses with the first radiation axis of the "infrared" LED 1.1*a* an acute angle β=60°. The same acute angle is accordingly enclosed by the main axis with the (second) radiation axis of the "blue" LED 1.1*b*. As a result, the photodiode 1.2*a* measures under an angle of 120° the infrared forward scattered radiation as produced by the "infrared" LED 1.1*a* on particles in the measuring volume and the blue scattered radiation as produced by the "blue" LED 1.1*b* is measured under a backward scattered radiation of 60α. Conversely, the photodiode 1.2*b* measures the blue forward scattered radiation which is produced by the "blue" LED 1.1*b* under an angle α of 120° and the infrared backward scattered radiation which is produced by the "infrared" LED 1.1*a* under a backward scattering angle of 60°.

In order to avoid any stray reflections, the LEDs and the photodiodes are situated in tube bodies such as 1.6. For the same reason suitably shaped diaphragms such as 1.3*a*, 1.3*b* as well as 1.4*a* and 1.4*b* are arranged between the LEDs and the photodiodes. Further sensors such as a temperature sensor at 1.8 and a gas sensor at 1.9 are arranged on the base plate 1.7.

As is conventional, a circuit board for producing the current pulses for the LEDs 1.1*a* and 1.1*b* as well as for processing the electric signals supplied by the photodiodes 1.2*a* and 1.2*b* is situated beneath the base plate 1.7. As is also conventional, the base plate 1.7 is housed in a detector housing (not shown) which allows an exchange between the ambient air and the air in the measuring chamber, but at the same time keeps outside light away from the measuring chamber.

Figure 2:
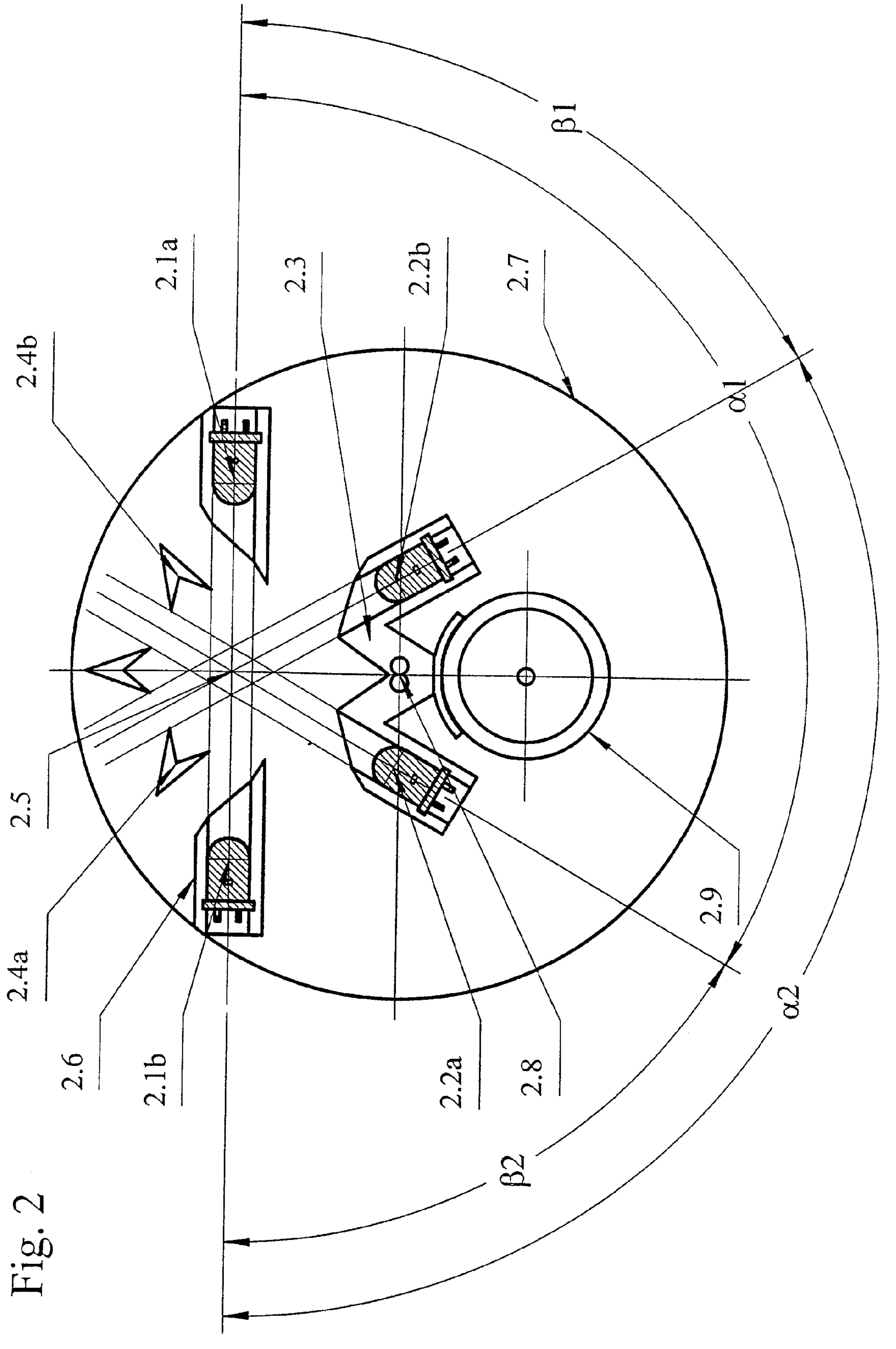
FIG. 2 shows the respective view of a second embodiment.

FIG. 2 shows a second embodiment of the detector with the same components as in FIG. 1, but with a different geometrical arrangement. In order to explain this arrangement in closer detail, the first digit of the respective reference numeral is provided here with "2" instead of "1". In contrast to FIG. 1, only the radiation axes of the infrared-radiating LED 2.1*a* and the blue-radiating LED 2.1*b* which go through the measuring center 2.5 will coincide. The receiving axis of the photodiode 2.2*a* encloses an angle $\alpha\mathbf{1}$=120° with the radiation axis of LED 2.1*a* and with the radiation axis of the blue-radiating LED 2.1*b* an angle $\beta\mathbf{2}$=60°. The receiving axis of the photodiode 2.2*b* encloses conversely with the radiation axis of the infrared-radiating LED 2.1*a* an angle $\alpha\mathbf{1}$=60° and with the radiation axis of the blue-radiating LED 2.1*b* an angle $\alpha\mathbf{2}$=120°. Accordingly, the first photodiode 2.2*a* measures the forward scattered radiation of the "infrared" LED 2.1*a* and the backward scattered radiation of the "blue" LED 2.1*b*. The second photodiode 2.2*b* conversely measures the forward scattered radiation which is produced by the "blue" LED 2.1*b* and the backward scattered radiation which is produced by the "infrared" LED 2.1*a*.

The photodiodes 2.2*a* and 2.2*b* can exchange their positions with the LEDs 2.1*a* and 2.1*b*, so that the two photodiodes are situated precisely opposite with respect to the measuring center 2.5. This geometrical arrangement of the four components, i.e., that of the two LEDs and the two photodiodes, is less favorable than that of FIG. 1 because only 75% of the four measured scattered radiations originate from the same measuring volume. This is illustrated by the intersecting surfaces between the beams which are shown by omitting the angular dependency both of the intensity of the emitted radiations as well as the sensitivity of the photodiodes as well as the diffraction effects which occur unavoidably on the edges. In the case of detectors which (as in the embodiment) comprise further sensors such as 2.8 and 2.9, there is an additional factor that the measuring center 2.5 is disposed in a strongly eccentric fashion with respect to the center of the base plate 2.7. This leads to the consequence that the sensitivity of the detector is not omni-directional as in the case of the first embodiment, but that it is dependent upon the direction from which the consequential products from the fire enter the detector and its measuring volume.

Figure 3:
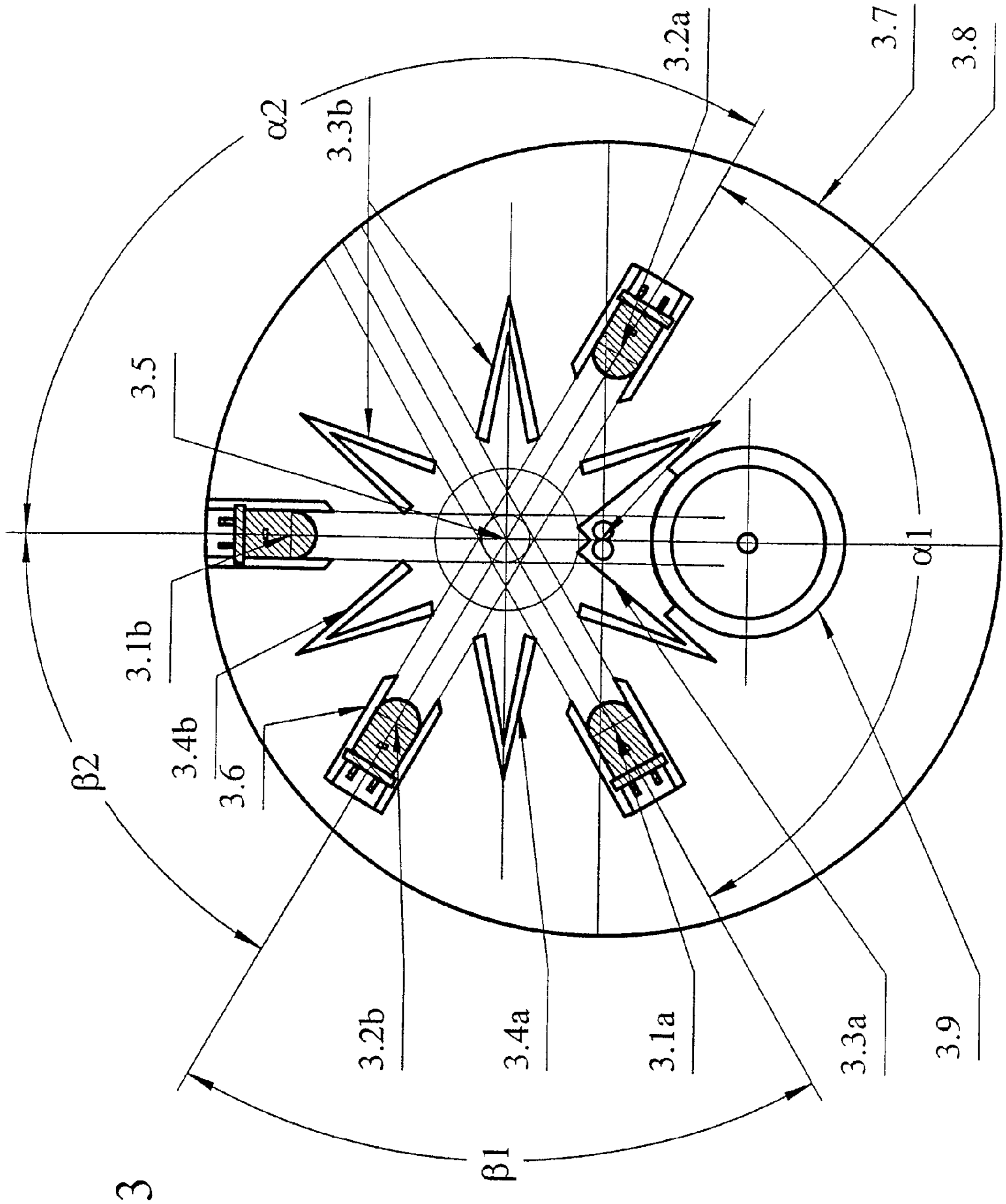
FIG. 3 shows the respective view of a third embodiment.

FIG. 3 shows a third embodiment of the detector with the same components as in FIG. 2, but with a different geometrical arrangement. In order to illustrate this in closer detail, the first digit of the respective reference numeral is provided here with "3" instead of "2". In contrast to FIG. 1, only the receiving axes of the photodiodes 3.2*a* and 3.2*b* coincide which pass through the measuring center 3.5. These receiving axes form the main axis. The "infrared" LED 3.1*a* encloses with the latter an acute angle $\alpha\mathbf{1}$=60° and an obtuse angle $\beta\mathbf{1}$=120°. The "blue" LED 3.1*b* is situated opposite of the "infrared" LED 3.1*a* with respect to the main axis, which "blue" LED accordingly encloses with the main axis an acute angle $\beta\mathbf{2}$=600 and an obtuse angle $\alpha\mathbf{2}$=120°. As a result, the photodiode 3.2*a* receives both the infrared forward scattered radiation as well as the blue forward scattered radiation, whereas the photodiode 3.2*b* receives both the infrared backward scattered radiation as well as the blue backward scattered radiation.

Other than is the case in FIG. 2, the two LEDs and the two photodiodes cannot be provided in this arrangement with an exchanged position, because in this case the two photodiodes would simultaneously measure the forward scattered radiation of the one LED and then the backward scattered radiation of the other LED, i.e., supply four measured values of which two would be approximately the same in pairs.

As in the case of FIG. 2, only 75% of the four measured scattered radiations each originate from the same measuring volume in the embodiment according to FIG. 3 as well. It is more advantageous than in the case of FIG. 2 in that the measuring volume, even in the case that the detector comprises further sensors such as 3.8 and 3.9, is situated closer to the center of the base plate 3.7, so that the sensitivity of the detector depends less strongly on the direction from which the consequential products from the fire enter the detector. An additional advantageous aspect in comparison with FIG. 2 is in the geometry according to FIG. 3 that all diaphragms 3.3*a*, 3.3*b* and 3.4*a*, 3.4*b* are arranged close to the measuring volume and are situated in a substantially symmetrical fashion around the same. Under the conditions that are the same otherwise, the positioning of the "blue" LED 3.1*b* causes a larger diameter of the base plate 3.7 as compared to FIG. 1.

Although it applies to all embodiments that the scattered radiations are measured under angles of 120° or 60°, the adherence to these angles is not a necessary precondition for performing the method proposed for implementing the invention. The important aspect is merely that the angles are chosen in such a way that in the forward scattered radiation direction and in the backward scattered radiation direction sufficiently high intensities can be measured on the one hand and sufficiently different intensities can be measured in the forward scattering region and in the backward scattering region of the respective particles for the largest possible number of different consequential fire products.

We claim:

1. A scattered-light fire detector comprising:

a measuring chamber which communicates with the ambient air and which delimits a measuring volume;

a first light emitting diode (LED) that emits infrared radiation into the measuring volume;

a second LED that emits blue light into the measuring volume from a different direction than the first LED; and first and second photodetectors situated opposite of each other on a common main axis with respect to each other and which measure the radiation scattered by particles situated in the measuring volume, wherein radiation axes of the first and second LEDs enclose an acute angle of less than 90° with the main axis and intersect in a point which is situated on the main axis and is situated in the center of the measuring volume.

2. A detector as claimed in claim 1, wherein the first and second LEDs are arranged on the same side of the main axis.

3. A detector as claimed in claim 1, wherein the first and second LEDs are arranged symmetrically to the main axis.

4. A detector as claimed in claim 1, wherein the first and second LEDs are arranged in a point-symmetrical fashion to the center of the measuring volume such that radiation axes of the first and second LEDs coincide.

5. A detector as claimed in claim 1, wherein radiation axes of the first and second LEDs each enclose with the main axis an acute angle of approximately 60°.

6. A detector as claimed in claim 1, further comprising:
tube bodies housing each of the first and second LEDs and each of the first and second photodetectors; and
diaphragms and radiation traps arranged in the measuring chamber outside of the measuring volume between the first and second LEDs and the first and second photodetectors.

7. A detector as claimed in claim 1, wherein the first photodetector receives the forward scattered radiation of the first LED and the backward scattered radiation of the second LED and the second photodetector receives the backward scattered radiation of the first LED and the forward scattered radiation of the second LED.

* * * * *